US009384444B2

(12) United States Patent
Kortum et al.

(10) Patent No.: US 9,384,444 B2
(45) Date of Patent: Jul. 5, 2016

(54) WEB ANALYTICS NEURAL NETWORK MODELING PREDICTION

(71) Applicant: Dell Products L.P., Round Rock, TX (US)

(72) Inventors: Natalie J. Kortum, Austin, TX (US); George B. Sadler, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 259 days.

(21) Appl. No.: 13/925,955

(22) Filed: Jun. 25, 2013

(65) Prior Publication Data

US 2014/0019391 A1     Jan. 16, 2014

Related U.S. Application Data

(63) Continuation-in-part of application No. 13/547,322, filed on Jul. 12, 2012.

(51) Int. Cl.
*G06N 3/02*     (2006.01)

(52) U.S. Cl.
CPC ........................................ *G06N 3/02* (2013.01)

(58) Field of Classification Search
None
See application file for complete search history.

(56) References Cited

PUBLICATIONS

Kohavi, Practical Guide to Controlled Experiments on the Web: Listen to Your Customers not to the HiPPO, ACM, 2007.*
Rahm Data Cleaning: Problems and Current Approaches, Bulletin of the IEEE Computer Society Technical Committee on Data Engineering, 2000.*
Crooks,"Data Pruning—Do You Have a Strategy in Place?", Blog, Feb. 15, 2012.*
Patel, "Lag Patterns in Time Series Databases," Springer-Verlag ,2010.*

* cited by examiner

*Primary Examiner* — Alan Chen
(74) *Attorney, Agent, or Firm* — Terrile, Cannatti, Chambers & Holland, LLP; Stephen A. Terrile

(57) ABSTRACT

A system and method are disclosed for optimizing website effectiveness. Original input data associated with a plurality of website effectiveness variables is processed using a website effectiveness model to generate a first website effectiveness value, which in turn is processed to generate a dependent variable. Input data corresponding to an individual website effectiveness variable is then processed to generate changed input data, which in turn is processed by the website effectiveness model with the original input data and the dependent variable to generate a second website effectiveness value. The first and second website effectiveness values are then processed to determine the effect of the changed data on the first website effectiveness value.

18 Claims, 4 Drawing Sheets

WEB ANALYTICS NEURAL NETWORK MODELING PREDICTION

BACKGROUND OF THE INVENTION

1. Field of the Invention

The present invention relates to the management of information handling systems. More specifically, embodiments of the invention provide a system, method, and computer-readable medium for using predictive web analytics to optimize the effectiveness of a website.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

These same information handling systems have played a key role in the rapid growth of electronic commerce on the Internet. One known aspect of electronic commerce is web analytics, which includes the measurement, collection, analysis and reporting of Internet data for purposes of understanding and optimizing web usage. In general, web analytics falls into two broad categories. The first, off-site web analytics, refers to the measurement of a target website's audience (e.g., opportunity), share of voice (e.g., visibility), and buzz (e.g., user comments) that is happening on the Internet as a whole. The second, on-site web analytics, refers to the measure a visitor's behavior at a target website. This behavior includes the user's drivers and purchase conversions in a commercial context. The data resulting from such on-site web analytics is typically compared against key performance indicators (KPIs) for performance, and is also used to improve the web site or the response from a marketing campaign. As such, web analytics can be a key component in ensuring that the company's web presence is driving the results it desires, including brand reputation, revenue, self-support, sales leads, etc.

Historically, web analytics has typically been based upon observed results with clear test case protocols, which includes A/B style testing where different versions of the same web page are served up and then measured to see which version results in higher click-through rates, purchase conversion, and so forth. However, such approaches generally require the creation of multiple test cases. Furthermore, analysts often find themselves relying upon their intuition when deciding which features should be developed for testing. Moreover, the number of tests that can be conducted is typically limited due to the time it takes to run each test individually or in combination with other tests. As a result, the accuracy and reliability of traditional web analytics approaches can prove to be limited.

SUMMARY OF THE INVENTION

A system and method are disclosed for using predictive web analytics to optimize the effectiveness of a website. In various embodiments, input data associated with website effectiveness variables is received and cleansed, and lag values are solved for time series data. An initial website effectiveness model is then built, using individual (e.g., Bayesian network), or combinations (e.g., combining Bayesian with structural equation models), of approaches. The resulting website effectiveness model is then pruned to ensure that business sense is maintained, and the initial model is then run.

In one embodiment, the initial results from running the model are combined into latent variables, or alternatively, their individual variable impacts are simply summed, to produce functional optimizations. Web Analytics data is then placed as independent variables into a multivariate econometric style model, where the dependent variable corresponds to a predetermined business purpose of the website. In various embodiments, the dependent variable may include one or more metrics related to customer experience, revenue, cost avoidance, or brand. In certain embodiments, key business drivers are captured in addition to the dependent variables that impact the business purpose output. In various embodiments, the addition of these business drivers allows isolation of the respective effect that each of the dependent variables has on the business outcome, purpose, or both. In certain embodiments, this isolation assists in identifying those parts of the website whose improvement will have the most impactful improvement to the business outcome.

In certain embodiments, a time series model approach is implemented with the aforementioned model to make it more predictive. In these and other embodiments, predetermined variables from the model are selected, each of which represents various functional levers. In turn, the time series model varies at least one variable from each functional lever. As a result, the time series model can show the impact of a given functional lever, such as sales, on revenue and website effectiveness in the future. This assists in the selection of areas to focus investment for testing purposes by providing "what if" scenario projections to predict the respective impact of various areas of the website on improvement to the business outcome. In turn, the larger Bayesian network model can then be used to provide the details of the specific variables and Key Performance Indicators (KPIs) that merit improvement. In various embodiments, an independent website effectiveness variable is selected and the initial website effectiveness value is used as the dependent variable. The model is then run with varying values of the independent variable to determine its respective effect on revenue and website effectiveness. The effect of these effects on revenue can then be quantified as inputs to a corresponding revenue model. The results of those subsequent runs can then be used to optimize individual business drivers to improve website effectiveness as well as overall revenue.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system and method is disclosed for using predictive web analytics to optimize the effectiveness of a website. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
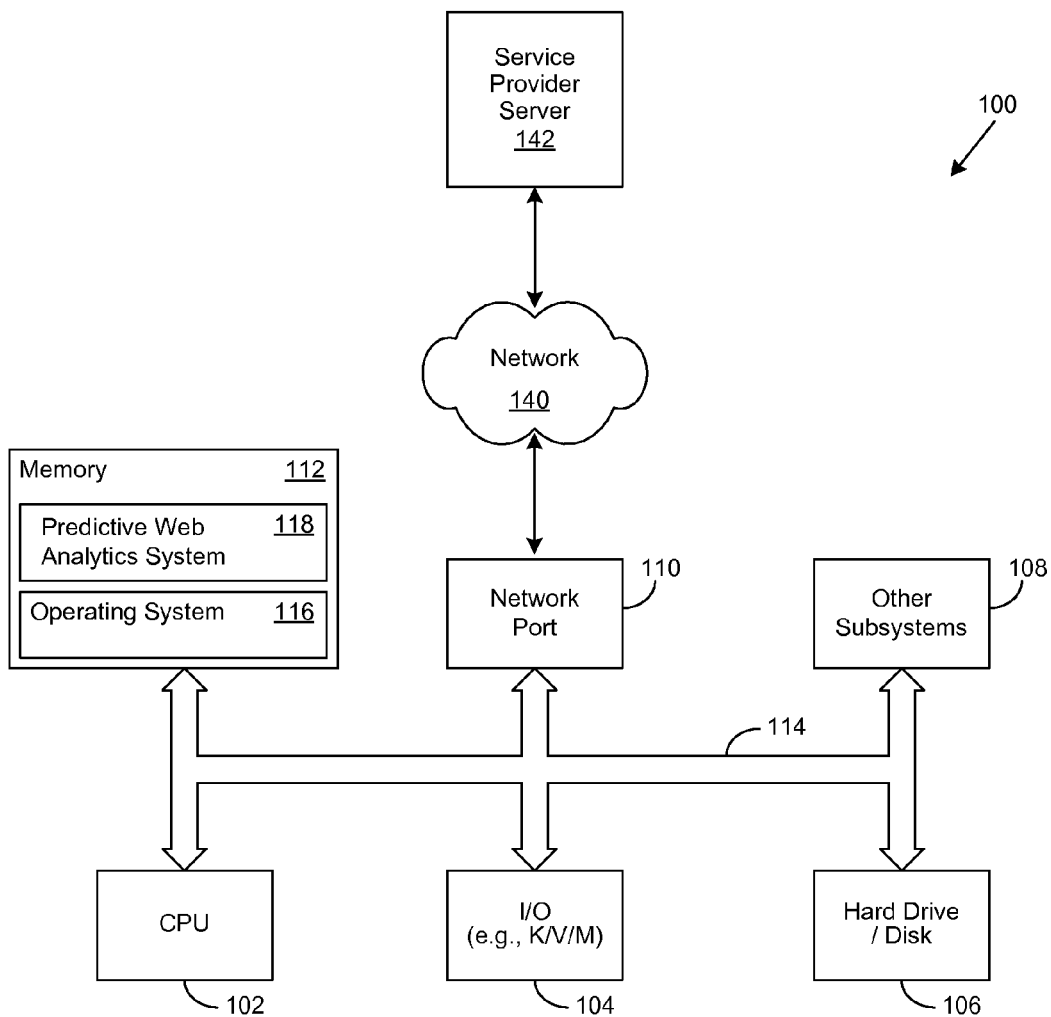
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which comprises operating system (OS) 116 and is interconnected to the foregoing via one or more buses 114. In various embodiments, the system memory 112 may also include a predictive web analytics system 118. In one embodiment, the information handling system 100 is able to download the predictive web analytics system 118 from the service provider server 142. In another embodiment, predictive web analytics system is provided as a service from the service provider server 142.

Figure 2:
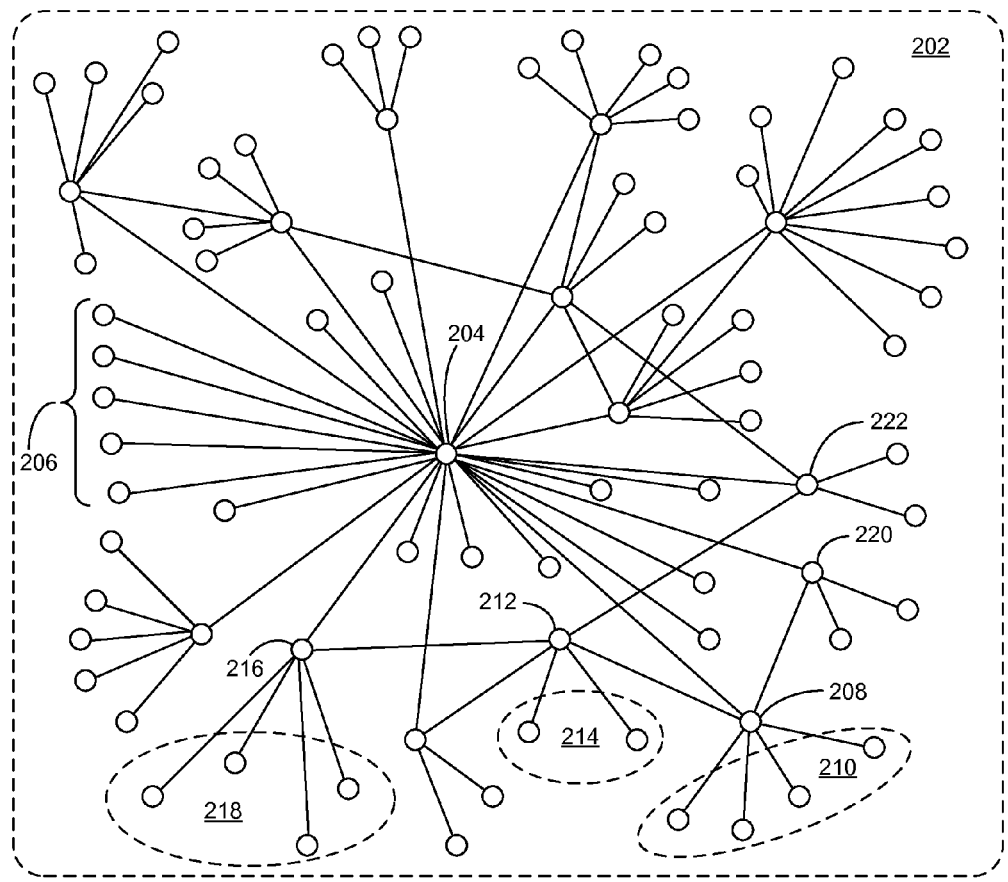
FIG. 2 is a simplified network diagram showing the relationship between a plurality of website effectiveness input variables.

FIG. 2 is a simplified network diagram showing the relationship between a plurality of website effectiveness variables implemented in accordance with an embodiment of the invention. As used herein, website effectiveness broadly refers to the effectiveness of a website in achieving its design goals. Examples of such design goals include customer experience, cost avoidance, revenue, and brand awareness. Examples of independent variables that could be measured include higher click-through rates on predetermined pages, conversion rates on download of content, conversion rates on adding items to a shopping cart, conversion rates on setting up a user account, return visits for predetermined content, page views on certain pages, clicks on ads, and watch counts of certain video types. As likewise used herein, a website effectiveness variable (i.e., an independent variable) broadly refers to an element of a website, such as a design, a feature, content, a message, a function, a process, or a user experience that contributes to website effectiveness. Other examples of a website effectiveness variable may include textual, graphical or video content that may be presented to a user statically, dynamically, or interactively. Further examples of a website effectiveness variable may include search engine optimization (SEO) terms and search engine marketing (SEM) functions that are implemented to selectively present predetermined promotional messages or other content to a user. Additional examples of a website effectiveness variable may include multiple or individual steps of a business process (e.g., online shopping) or a user experience (e.g., customer service). Skilled practitioners of the art will recognize that many such examples of a website effectiveness variable are possible and that the foregoing examples are not intended to limit the spirit, scope or intent of the invention.

In this embodiment, a plurality of website effectiveness variables 202 are implemented in a Bayesian network to provide website analytics input data to a predictive website analytics model 204. In various embodiments, the plurality of website effectiveness variables 202 may include individual 206 website effectiveness variables. In these and other embodiments, the website effectiveness variables 202 may likewise include aggregate 208, 212, 216 website effectiveness variables that respectively include related groups 210, 214, 218 of website effectiveness variables. In various embodiments, the website effectiveness variables 202 may likewise include correlated 208, 212, 216, 220 website effectiveness variables that are variously affected by their counterparts, which in turn affect the values they provide to the predictive website analytics model 204. It will be appreciated by those of skill in the art that many such embodiments are possible and the foregoing are provided only as examples and are not intended to limit the spirit, scope or intent of the invention.

Figure 3:
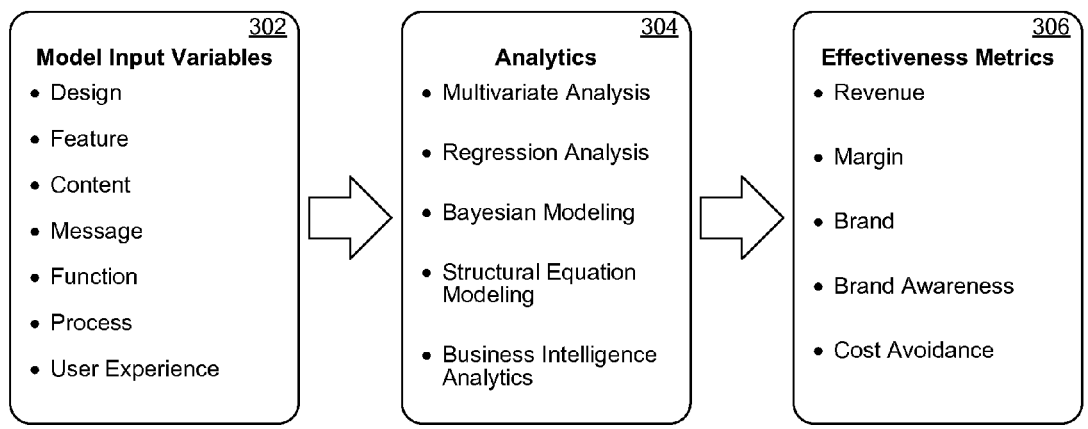
FIG. 3 is a simplified block diagram showing the analysis of website effectiveness input variables to generate website effectiveness metrics.

FIG. 3 is a simplified block diagram showing the analysis of website effectiveness variables implemented in accordance with an embodiment of the invention to generate website effectiveness metrics. As shown in FIG. 3, a plurality of model input variables 302 are analyzed using one or more analytic 304 methods to generate website effectiveness metrics 306. In various embodiments, the model input variables 302 may comprise website effectiveness variables related to a design, a feature, content, a message, a function, a process, or a user experience as described in greater detail herein.

As shown in FIG. 3, the one or more analytic 304 methods may comprise analytic 304 methods familiar to those of skill in the art, such as multivariate analysis, regression analysis, Bayesian modeling, structured equation modeling (SEM), and business intelligence (BI) analytics. In various embodiments, and as described in greater detail herein, these one or more analytic 304 methods may be implemented to generate a brand equity ROI model. Likewise, as shown in FIG. 3, the resulting website effectiveness metrics 306 generated from performing the aforementioned analytic 304 methods may correspond to revenue and margin growth measured by total return on investment (ROI), brand, brand awareness, and cost avoidance.

In certain embodiments, revenue value, cost avoidance, and customer experience are calculated as follows:

$$\text{Revenue} = \beta_0 + \beta_1 * \text{Brand} + \beta_2 * X_1 + \beta_3 * X_2 + \beta_4 * X_1 + \beta_5 * X_2 + \beta_6 * X_3$$

$$\text{Cost Avoidance} = \beta_0 + \beta_1 * \text{Brand} + \beta_2 * X_1 + \beta_3 * X_2 + \beta_4 * X_1 + \beta_5 * X_2 + \beta_6 * X_3$$

$$\text{Customer Experience} = \beta_0 + \beta_1 * \text{Brand} + \beta_2 * X_1 + \beta_3 * X_2 + \beta_4 * X_1 + \beta_5 * X_2 + \beta_6 * X_3$$

where $\beta_0$ is the base.

In order to determine the area of focus, the elasticities, and the respective degree of each dependent variable's contribution to the effectiveness of the website can then be compared to one another to assist in prioritizing areas for future investment.

Figure 4:
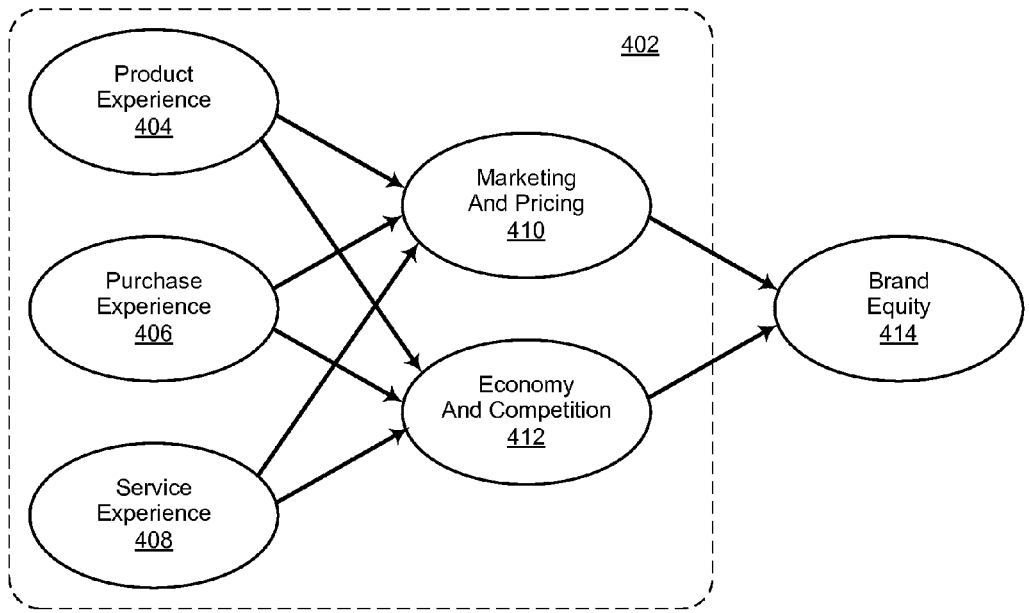
FIG. 4 is a simplified block diagram showing the causal relationship between a plurality of website effectiveness input variables and their resulting effect on website effectiveness.

FIG. 4 is a simplified block diagram showing the causal relationship between a plurality of website effectiveness input variables implemented in accordance with an embodiment of the invention and their resulting effect on website effectiveness. As shown in FIG. 4, the website effectiveness variables 402, as described in greater detail herein, may comprise website design 404, website features 406, website content 408, website functions and processes 410, and user experience 412. In this embodiment, the causal relationship of the website effectiveness variables 402 between themselves and a website effectiveness 414 model is expressed as a structural equation model (SEM) familiar to skilled practitioners of the art. These same skilled practitioners will recognize that the website effectiveness variables 402 may comprise other website effectiveness variables that are not shown and that the foregoing is not intended to limit the spirit, scope or intent of the invention.

As described in greater detail herein, various analytic methods (e.g., multivariate analysis, regression analysis, Bayesian modeling, SEM, business intelligence analytics, etc.) may be implemented individually or in combination to generate a website effectiveness 414 model.

Once the model is generated, the respective effect of various website effectiveness variables 402, either individually or by classes, groups or interrelationships, can be determined. As an example, it may be desirable to analyze and optimize the effect website innovation has on the web effectiveness 414 model. Accordingly, the values of various website effectiveness variables 402 are scaled back, leaving only the website effectiveness variables 402 that are most relevant to website innovation. The granularity of the remaining website effectiveness variables 402 is then increased. As a result, the effect on the website effectiveness 414 model can be seen in detail by varying the values of each of the remaining website effectiveness variables 402.

Those of skill in the art will appreciate that various instances of the website effectiveness 414 model may require recalibration from time to time. For example, the effect of one of the more granular website effectiveness variables 402 may demonstrate a greater effect on the website effectiveness 414 model than others. As a result, this variable is included as an individual, or more highly valued, website effectiveness variable 402 in a higher-level website effectiveness 414 model. In various embodiments, the more effective website effectiveness variable 402 is incorporated appropriately in other website effectiveness 414 models as well.

Skilled practitioners of the art will be aware that Bayesian modeling does not lend itself to being predictive. Accordingly, in various embodiments, predetermined key website effectiveness variables 402 are taken from a Bayesian website effectiveness 414 model and are then included in a time series approach to make the website effectiveness 414 model more predictive. In these and other embodiments, each functional group of website effectiveness variables 402 includes at least one website effectiveness variable 402 that is represented in the time series. This approach provides the ability to make predictions at a functional level. If additional details are required, then the Bayesian models can be analyzed to provide a plethora of details related to the various website effectiveness variables 402 in each respective Bayesian model. Those of skill in the art will recognize that the aforementioned approach is more limiting on the website effectiveness variables 402 that can be included in a website effectiveness 414 model.

In one embodiment, more frequent results from the website effectiveness 414 model are possible without having to relearn a source Bayesian network. In this and other embodiments, the input website effectiveness variables 402 are used with the existing network on a recurring basis. As the values of the input website effectiveness variables 402 change over time, resulting results and optimization details are provided, which in turn are used as guidance for course corrections on website investment plans, etc. In another embodiment, the same website effectiveness input variables 402 are used, but they are revised to correspond to an industry-specific revenue to determine the relative impact of the website effectiveness input variables 402 within those industry sectors.

In yet another embodiment, the time period for collecting measurement data associated with the website effectiveness input variables 402 is extended, with a corresponding decrease in the granularity of the website effectiveness input variables 402 associated with various aspects of website effectiveness. In still another embodiment, the website effectiveness 414 model is based upon a regression analysis model. In another embodiment, the website effectiveness 414 model is based upon a regression analysis model is based upon a Bayesian model approach combined with a SEM model. In this and other embodiments, the aforementioned website effectiveness 414 model is based upon a regression analysis model is used for validation. Those of skill in the art will realize that negative impacts resulting from the measurement data associated with the website effectiveness input variables 402 may have a negative influence on website effectiveness 414 model, which is acceptable.

In still another embodiment, the website effectiveness variables 402 comprise social media metrics. In this and other embodiments, the social media metrics are used to capture difficult-to-measure key performance indicators (KPIs), such as website innovation, and to provide an additional source for website effectiveness metrics that are more real-time in nature. In these various embodiments, it will be appreciated by skilled practitioners of the art that metrics associated with certain website effectiveness variables 402 may be more difficult to capture and using data from social media sources may be advantageous. As an example, it is possible that certain KPIs may be internally tweaked to make the effectiveness of a website appear successful, despite the fact that decisions are not being made for the right reasons. In such an example, social media metrics may provide improved measurements that are more reflective of the actual causes for the successful effectiveness. From the foregoing, it will be appreciated that if social media metrics perform better than functional group KPIs, then a case can be made to either improve the KPIs or turn to social media measurements in lieu of the existing KPIS, as they are more heavily correlated with business impact.

Figure 5:
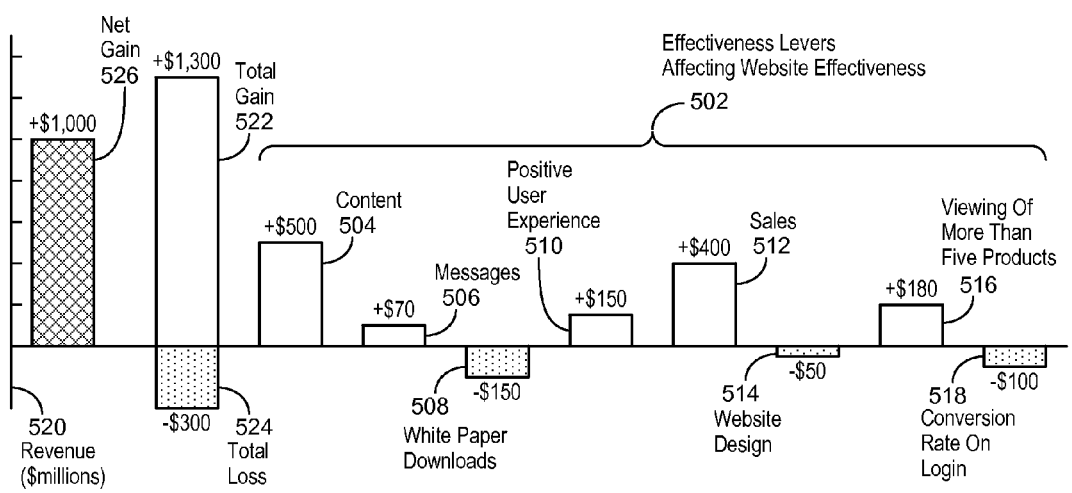
FIG. 5 is a simplified bar chart showing the relative effect of a plurality of website effectiveness input variables on website effectiveness.

FIG. 5 is a simplified bar chart showing the relative effect of a plurality of website effectiveness input variables, as implemented in accordance with an embodiment of the invention, on website effectiveness. In this embodiment, website effectiveness variables, as described in greater detail herein, are respectively adjusted to act as "effectiveness levers" 502 to determine their relative effect on website effectiveness. As shown in FIG. 5, the effectiveness levers 502 being considered in this embodiment comprise "content" 504, "messages" 506, "whitepaper downloads" 508, "positive user experience" 510, "sales" 512, "website design" 514, "viewing of more than five products" 516, and "conversion rate on login" 518. The resulting relative effect for predetermined values of the effectiveness levers 502 is then displayed in graphical form, along with a graphical representation of their effect upon revenue 520. As shown in FIG. 5, the resulting relative website effectiveness is displayed as "total gain" 522, "total loss" 524, and "net gain" 526. It will be appreciated that it is possible that the resulting relative effect will change as the value of each of the effectiveness levers 502 is changed. It will likewise be appreciated that applying various website effectiveness models, as described in greater detail herein, allows for not only a full business view incorporating all business units, but also individual business units or lines of business by adjusting the effectiveness levers 502 that have an impact on revenue, web effectiveness, etc.

Figure 6:
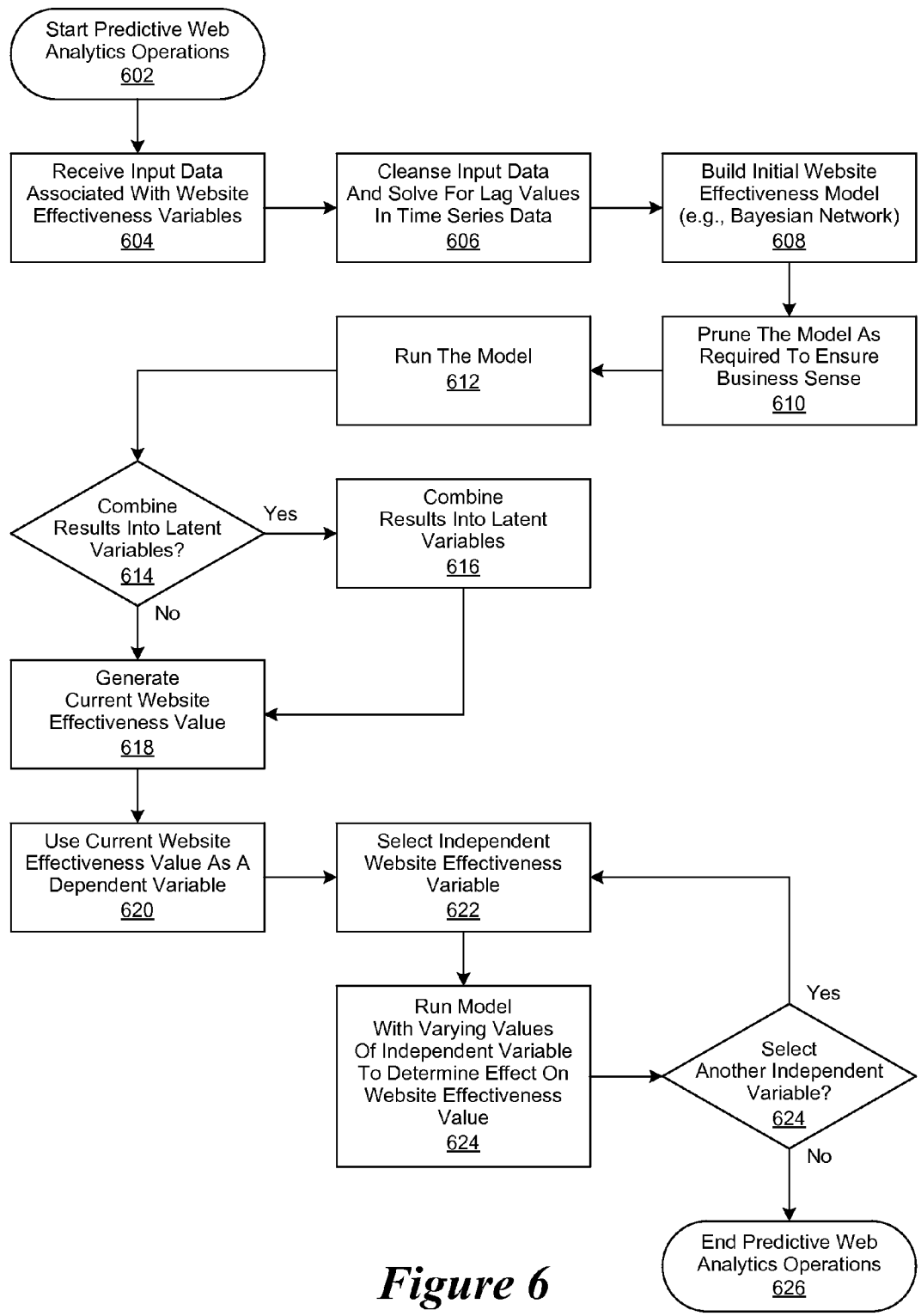
FIG. 6 is a generalized flow chart of the performance of predictive web analytics operations.

FIG. 6 is a generalized flow chart of the performance of predictive web analytics operations implemented in accordance with an embodiment of the invention. In this embodiment, predictive web analytics operations are begun in step 602, followed by the receipt in step 604 of input data associated with website effectiveness variables described in greater detail herein. Then, in step 606, the input data is cleansed and lag values are solved for in time series data, using approaches familiar to those of skill in the art. An initial website effectiveness model is then built in step 608, using individual (e.g., Bayesian network) or combinations (e.g., combining Bayesian with structural equation models) of approaches described in greater detail herein. The resulting website effectiveness model is then pruned in step 610 to ensure that business sense is maintained, and the initial model is then run in step 612.

A determination is then made in step 614 whether to combine the initial results from running the model into latent variables, or alternatively, simply sum individual variable impacts, to produce functional optimizations. As an example, a website effectiveness variable's revenue impact and elasticity, etc. is calculated by considering all variables associated with the website effectiveness variable's key performance indicators (KPIs) that are considered meaningful. If it is determined in step 614 to perform the combination or summation operations, then they are performed in step 616. Otherwise, or once the combination or summation operations are performed in step 616, then a current website effectiveness value is generated in step 618.

Then, in step 620, the resulting website effectiveness value is used as a dependent variable in the model in subsequent steps. In one embodiment, website effectiveness measurements are added to a "floating base" to determine the website effectiveness value. In this embodiment, the floating base is the equivalent of a constant in an equation. For example, in the equation y=ax+b, 'b' would be the floating base. In this and other embodiments, the website effectiveness value is accurate if all website effectiveness variables have been included as inputs to the website effectiveness model. It will be appreciated that failure to include all relevant website effectiveness variables will likely result in an inaccurate website effectiveness value. As an example, failure to include all website effectiveness values that have an impact on revenue will result in their actual impact being undefined not contributing to producing an accurate website effectiveness value. From the foregoing, it will be appreciated that the selection of website effectiveness variables is directly related to website effectiveness model producing meaningful and accurate results.

An independent website effectiveness variable is then selected in step 622, and the initial website effectiveness value is used as the dependent variable. The model is then run in step 624 with varying values of the independent variable to determine its respective effect on website effectiveness value. The effect of these effects on website effectiveness can then be quantified as inputs to a corresponding website effectiveness model. As an example, contribution percentages from the results of this run of the model can be applied to the website effectiveness variable "revenue value" in subsequent runs of the website effectiveness model. The results of those subsequent runs can then be used to optimize website effectiveness variables to improve overall website effectiveness. Those of skill in the art will recognize that the foregoing approach will assist in determining the long-term impact of a given website effectiveness variable on overall website effectiveness. A determination is then made in step 624 whether to select another independent variable. If so, then the process is continued, proceeding with step 622. Otherwise, predictive website analytics operations are ended in step 626.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for optimizing website effectiveness, comprising:
    implementing a plurality of website effectiveness variables within a Bayesian network, the plurality of website effectiveness variables comprising individual website effectiveness variables, aggregate website effectiveness variables, each aggregate website effectiveness variable comprising a respective group of website effectiveness variables, and correlated website effectiveness variables, each correlated website effectiveness variable being affected by at least one counterpart website effectiveness variable;
    receiving original input data associated with the plurality of website effectiveness variables, the plurality of website effectiveness variables corresponding to a respective plurality of elements of a website contributing to website effectiveness;
    processing the original input data to generate a first website effectiveness value, the input data processed by a website effectiveness model;
    processing the first website effectiveness value to generate a dependent variable;
    changing input data corresponding to an individual website effectiveness variable of the plurality of website effectiveness variables to generate changed input data;
    using the website effectiveness model to process the original input data, the dependent variable, and the changed input data with to generate a second website effectiveness value; and
    processing the first and second website effectiveness values to determine the effect of the changed data on the first website effectiveness value.

2. The method of claim 1, wherein the original input data comprises measurement data associated with at least one of:
    a website design;
    a website feature;
    website content;
    a website message;
    a website function;
    a website process; and
    a website user experience.

3. The method of claim 1, wherein an analytic method used by the website effectiveness model comprises at least one of:
    multivariate analysis;
    regression analysis;
    Bayesian modeling;
    structural equation modeling (SEM); and
    business intelligence analytics.

4. The method of claim 1, wherein the original input data is cleansed prior to being processed.

5. The method of claim 1, wherein:
    the original input data comprises time series data further comprising lag values; and
    the lag values are processed to solve the lag values prior to being processed.

6. The method of claim 1, wherein the website effectiveness model is pruned prior to being processed to ensure business sense.

7. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
        implementing a plurality of website effectiveness variables within a Bayesian network, the plurality of website effectiveness variables comprising individual website effectiveness variables, aggregate website effectiveness variables, each aggregate website effectiveness variable comprising a respective group of website effectiveness variables, and correlated website effectiveness variables, each correlated website effectiveness variable being affected by at least one counterpart website effectiveness variable;
        receiving original input data associated with a plurality of website effectiveness variables, the plurality of website effectiveness variables corresponding to a respective plurality of elements of a website contributing to website effectiveness;
        processing the original input data to generate a first website effectiveness value, the input data processed by a website effectiveness model;
        processing the first website effectiveness value to generate a dependent variable;
        changing input data corresponding to an individual website effectiveness variable of the plurality of website effectiveness variables to generate changed input data;
        using the website effectiveness model to process the original input data, the dependent variable, and the changed input data with to generate a second website effectiveness value; and
        processing the first and second website effectiveness values to determine the effect of the changed data on the first website effectiveness value.

8. The system of claim 7, wherein the original input data comprises measurement data associated with at least one of:
    a website design;
    a website feature;
    website content;
    a website message;
    a website function;
    a website process; and
    a website user experience.

9. The system of claim 7, wherein an analytic method used by the website effectiveness model comprises at least one of:
    multivariate analysis;
    regression analysis;
    Bayesian modeling;
    structural equation modeling (SEM); and
    business intelligence analytics.

10. The system of claim 7, wherein the original input data is cleansed prior to being processed.

11. The system of claim 7, wherein:
    the original input data comprises time series data further comprising lag values; and
    the lag values are processed to solve the lag values prior to being processed.

12. The system of claim 7, wherein the website effectiveness model is pruned prior to being processed to ensure business sense.

13. A non-transitory, computer-readable storage medium embodying computer program code, the computer program code comprising computer executable instructions configured for:
- implementing a plurality of website effectiveness variables within a Bayesian network, the plurality of website effectiveness variables comprising individual website effectiveness variables, aggregate website effectiveness variables, each aggregate website effectiveness variable comprising a respective group of website effectiveness variables, and correlated website effectiveness variables, each correlated website effectiveness variable being affected by at least one counterpart website effectiveness variable;
- receiving original input data associated with a plurality of website effectiveness variables, the plurality of website effectiveness variables corresponding to a respective plurality of elements of a website contributing to website effectiveness;
- processing the original input data to generate a first website effectiveness value, the input data processed by a website effectiveness model;
- processing the first website effectiveness value to generate a dependent variable;
- changing input data corresponding to an individual website effectiveness variable of the plurality of website effectiveness variables to generate changed input data;
- using the website effectiveness model to process the original input data, the dependent variable, and the changed input data with to generate a second website effectiveness value; and
- processing the first and second website effectiveness values to determine the effect of the changed data on the first website effectiveness value.

14. The non-transitory, computer-readable storage medium of claim 13, wherein the original input data comprises measurement data associated with at least one of:
- a website design;
- a website feature;
- website content;
- a website message;
- a website function;
- a website process; and
- a website user experience.

15. The non-transitory, computer-readable storage medium of claim 13, wherein an analytic method used by the website effectiveness model comprises at least one of:
- multivariate analysis;
- regression analysis;
- Bayesian modeling;
- structural equation modeling (SEM); and
- business intelligence analytics.

16. The non-transitory, computer-readable storage medium of claim 13, wherein the original input data is cleansed prior to being processed.

17. The non-transitory, computer-readable storage medium of claim 13, wherein:
- the original input data comprises time series data further comprising lag values; and
- the lag values are processed to solve the lag values prior to being processed.

18. The non-transitory, computer-readable storage medium of claim 13, wherein the website effectiveness model is pruned prior to being processed to ensure business sense.

* * * * *